United States Patent [19]
Orton

[11] Patent Number: 5,083,346
[45] Date of Patent: Jan. 28, 1992

[54] FASTENING ASSEMBLY

[76] Inventor: Douglas O. Orton, 1577 NE. La Mesa Pl., Gresham, Oreg. 97030

[21] Appl. No.: 530,543

[22] Filed: May 24, 1990

[51] Int. Cl.⁵ .............................................. B65D 63/00
[52] U.S. Cl. .................................. 24/16 PB; 248/61; 248/68.1; 248/74.3
[58] Field of Search ............. 24/16 R, 16 PB, 30.5 R, 24/30.5 PB, 17, 40; 248/74.3, 61, 68.1

[56] References Cited

U.S. PATENT DOCUMENTS

| | | | |
|---|---|---|---|
| 2,832,116 | 4/1958 | Clevett, Jr. et al. | 24/30.5 R |
| 3,654,669 | 4/1972 | Fulton | 24/16 PB |
| 3,668,744 | 6/1972 | Moody et al. | |
| 4,562,982 | 1/1986 | McSherry et al. | |
| 4,663,496 | 5/1987 | Peek, Jr. | |
| 4,819,897 | 4/1989 | Gooding | |
| 4,909,051 | 3/1990 | Lee | 248/74.3 X |

FOREIGN PATENT DOCUMENTS 1471561  1/1967  France ............................... 24/30.5 P

OTHER PUBLICATIONS

"Panduit Cable Ties," Panduit Corp. Catalog E-101, Section CT, pp. 1-19, 26 and 32 and Section WA, p. 1, undated.

"Panduit Wiring Products," Panduit Corp. Catalog E-CC-9A, pp. 1, 3-9, undated.

"Selection of Cable Ties for Use in Various Environments," Panduit Corp. Technical/Application Data Sheet TADS-CT-15A, Copyright 1982.

Primary Examiner—James R. Brittain
Attorney, Agent, or Firm—Chernoff, Vilhauer, McClung & Stenzel

[57] ABSTRACT

A fastening assembly for elongate articles comprising an annular member and a nondeformable flexible strap, the strap being adapted for passage through the channel of the annular member so that the articles are received upon, and resiliently opposed by, seating members provided along each marginal edge of the annular member. A pair of movable sidewall members resiliently opposite the respective portions of the strap passing through the channel. Lateral vibrations between the articles are damped and crimping, chafing, and longitudinal slippage of the articles is resisted.

14 Claims, 3 Drawing Sheets

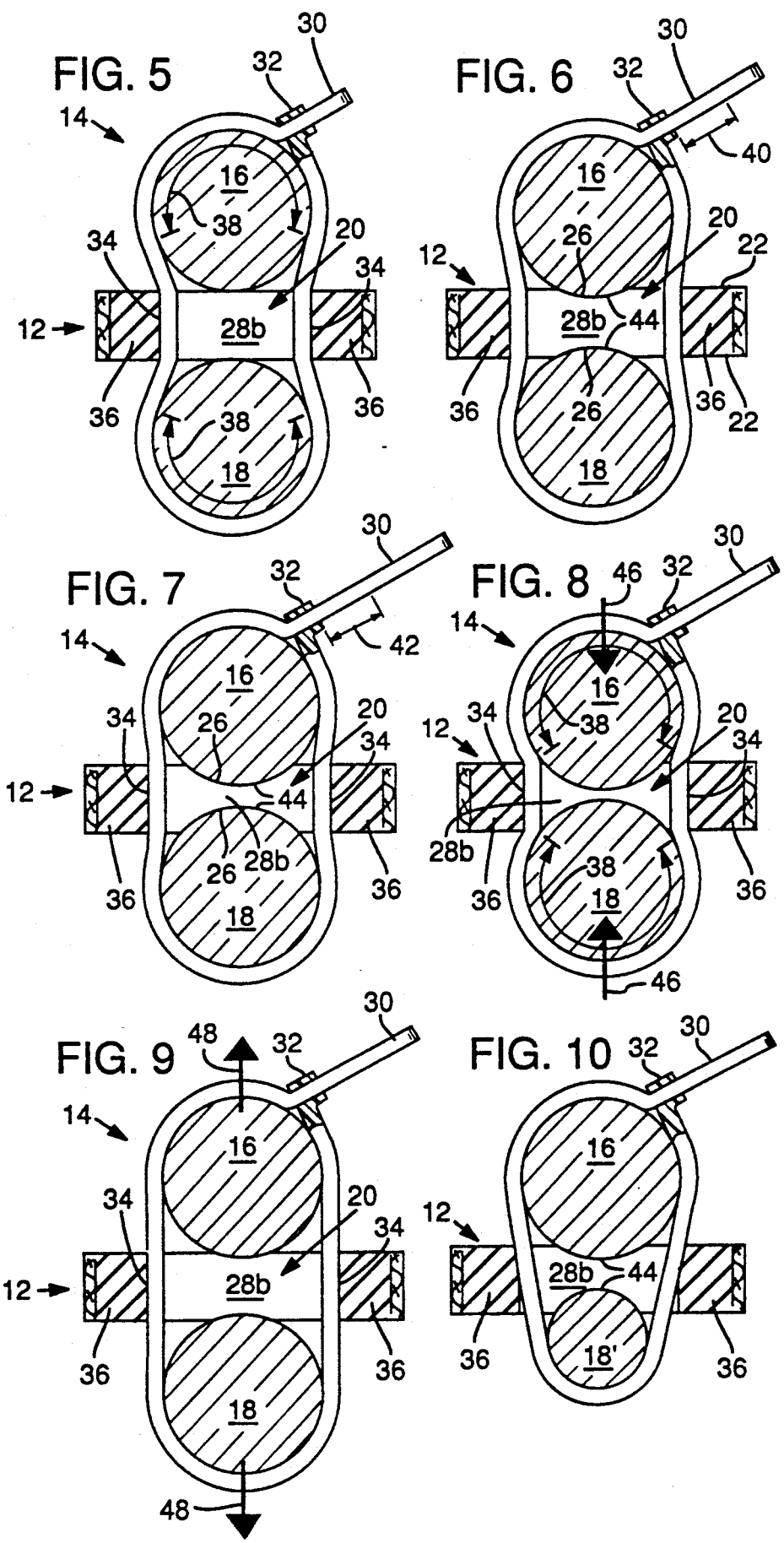

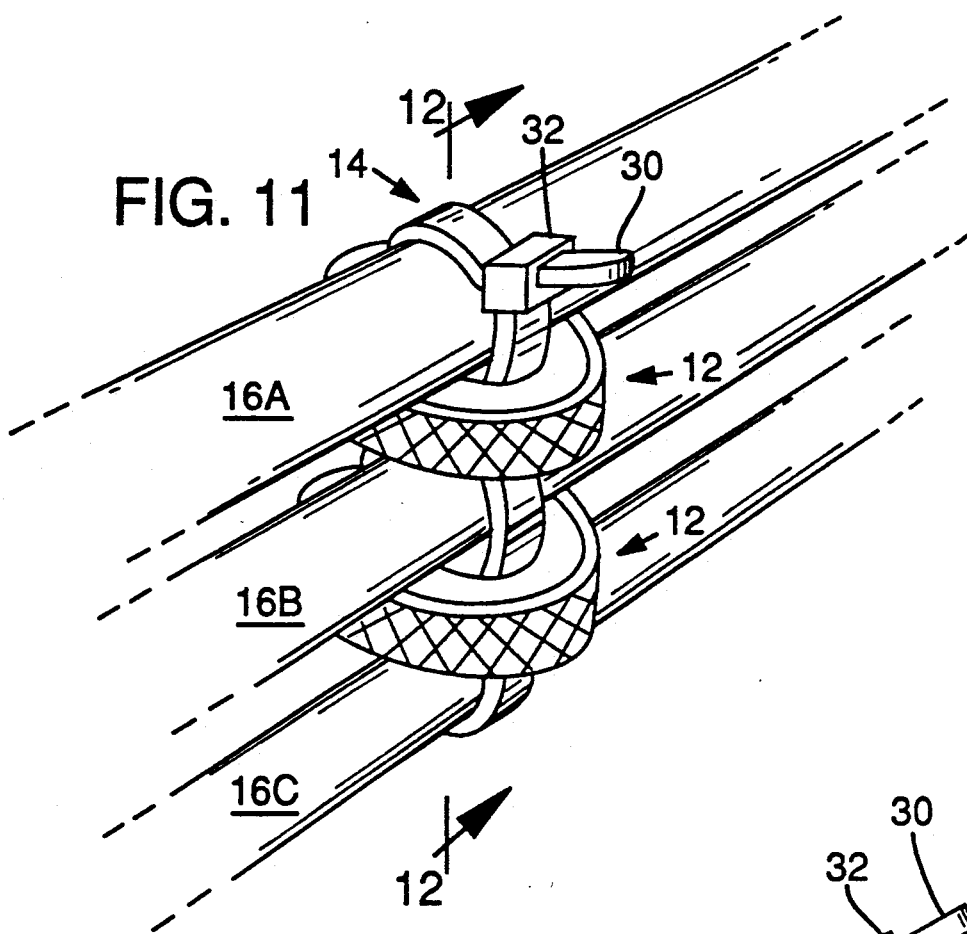
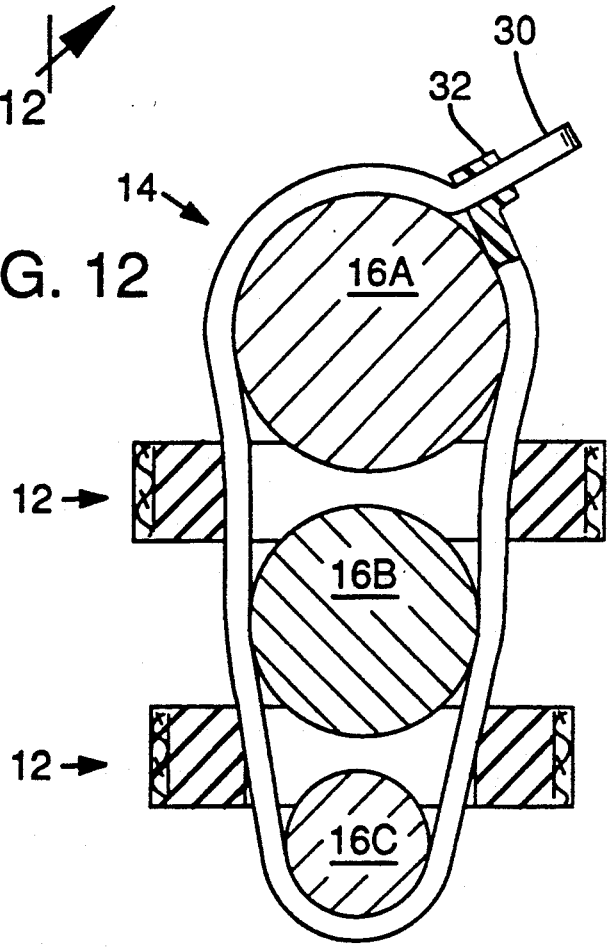

FASTENING ASSEMBLY

BACKGROUND OF THE INVENTION

The present invention relates to a novel assembly for fastening together or supporting various elongate articles such as pipes, cables, rods, tubing or hoses. The invention is particularly useful for securing electrical, fuel, oil, hydraulic or pneumatic lines in harsh environments subject to sustained vibration, such as found along the engine mounting frame of aircraft or in other aeronautical, astronautical, industrial or automotive environments.

In the inventor's experience as an aircraft mechanic and authorized inspector, many of the planes arriving for service required additional work due to problems in their original fastening systems. Three fastening methods that have performed more adequately than others under the above-mentioned conditions are rubberized cushioned clamps, lacing cord and cable ties.

Rubberized cushioned clamps are metal straps which have screw holes at each end and a rubber liner. A separate clamp is bent around each of the hoses or cables to be connected and the clamps are then fastened together, through the holes at their ends, by a screw and nut. To fit the many sizes of hoses or cables in use, many different sizes of straps must be kept in stock and a moderate expenditure of time is involved in properly bending the straps and in screwing the nut fully into position. Furthermore, lubricating solvents, such as engine oils, can attack the thin rubber liner separating the hose or cable from the metal strap, so that the edges of the metal strap will gradually cut through the hose or cable and cause line failure.

Lacing cord is a stretchy plastic cord that comes in 100 or 1000-ft spools. The cord is cut to length, lashed around the hoses or cables to be connected, and thereafter tied. Proper lashing and tying of the cord requires at least 6 to 8 inches of clearance around the fastening area and is virtually a lost art because such labor-intensive activity is uneconomical at today's labor rates. High temperatures can loosen the plastic cord and cause line failure if, for example a segment of the fastened hose or cable bunches together and establishes contact with a nearby moving part or hot surface.

Cable ties are generally nylon straps that have a free end adapted for insertion through a self-locking head at their second end. They can be used in combination with spacers of a type such as disclosed in Moody et al. U.S. Pat. No. 3,668,744, McSherry et al. U.S. Pat. No. 4,562,982 and Gooding U.S. Pat. No. 4,819,897. During use, for example, with a spacer of the type disclosed in McSherry et al., the cable tie is passed through an opening in the annular member which comprises the spacer, around one of the cables, back through another opening in the spacer and around the other one of the cables, the tie thereupon being closed and tightened so that each cable is secured in lengthwise, mutually parallel relation across opposite marginal edges of the annular member. With this arrangement, if the strap is initially overtightened, or if external forces cause the cables to vibrate laterally relative to one another, the nylon strap being of nondeformable material can pinch into or chafe the cables. Additionally, the compressive forces which are exerted by the vibrating cables on the narrow edges of the spacer can cause the spacer to crack and split open. One approach for mitigating these difficulties is suggested by the separator clip of Moody et al., where each cable is held to a separate arm of the clip by a separate cable tie and where the arms are able to flex toward and away from each other since they are held together, only at one end, by a resilient stem.

Another problem encountered is external forces which cause cables or hoses to vibrate longitudinally relative to one another. Where the spacer used relies on a notched channel to receive each cable or hose, as shown in McSherry et al., only that limited outer portion of each cable or hose which is arranged adjacent either side of the notch will establish contact with the channel. Because only a limited area is then provided for frictional engagement, slippage or creep may occur between the cables or hoses, and the cables or hoses may stretch and burst or may bunch up and make contact with hot surfaces or moving parts. Other prior art spacers, such as shown by Gooding, form the channel so as to match the curvature of the cables or hoses to be held. This approach, however, requires that a variety of spacers be made and retained in stock to match the different sizes of cables or hoses encountered.

Another problem with the notched channel found on spacers of the type shown in McSherry et al. is the tendency for solvents, such as oils and other lubricants, which promote cable slippage and corrosion, to become trapped inside the space formed between the rounded outer portion of the cable and the apex of the channel.

The present invention is directed toward a fastening assembly of novel design and construction which is suitable for fastening together all manner of elongate articles and which overcomes the aforementioned drawbacks of prior art devices used in the applications described.

SUMMARY OF THE PRESENT INVENTION

In accordance with the present invention, a fastening assembly is provided for lashing together elongate articles, such as cables or hoses, which includes an annular member and a nondeformable flexible strap. The strap is adapted for passage through a channel in the annular member, around one of the articles, back through the channel, and around the other one of the articles, so that each elongate article is held lengthwise across a respective marginal edge of the annular member. Each article is received upon the annular member by forward and rearward seating members which resiliently oppose forward and rearward outer portions on each elongate article.

In another aspect of the present invention, movable sidewall members are provided which are located at those sides of the channel along which respective portions of the strap are passed, such sidewall members serving to resiliently oppose and inwardly urge together these respective portions of the strap.

In yet another aspect of the present invention, the annular member is composed of an elastomeric material and the seating members and sidewall members are integrally formed therein.

Accordingly, a primary object of the present invention is to provide a system for fastening rigid or flexible elongate articles which is capable of withstanding sustained or severe vibrational forces without article damage or failure.

A related object of the present invention is to provide a fastening assembly which accommodates vigorous lateral vibration between fastened articles without crimping or chafing thereof.

Another related object of the present invention is to provide a fastening assembly that can be subjected to vibration without longitudinal slippage and creep between the fastened articles.

A further object of the present invention is to provide a universal-type fastening assembly which readily adapts to the dimensions of the articles that are connected thereby.

Yet a further object of the present invention is to provide a fastening assembly for resisting fastener or article failure due to overtightening.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 5 is a sectional side view of the fastening assembly of FIG. 2, taken along lines 5—5, showing closure of the strap around the cables prior to tightening of the strap to a length that would cause the annular member to deform or stretch.

FIG. 6 is a view of the fastening assembly of FIG. 5 where the strap has been tightened to a length causing the annular member to deform and stretch.

FIG. 7 is a view of the fastening assembly of FIG. 6 where the strap has been tightened by an additional increment.

FIG. 8 is a view of the fastening assembly of FIG. 6 where external forces have been introduced causing the cables to move inwardly toward each other.

FIG. 9 is a view of the fastening assembly of FIG. 6 where external forces have been introduced causing the cables to move outwardly from one another.

FIG. 10 is a view of the fastening assembly similar to that of FIG. 6, but where a different-sized cable has been substituted for the lower cable.

FIG. 11 is a perspective view of a fastening assembly in accord with the present invention where a plurality of annular members are included for holding a plurality of different sized cables.

FIG. 12 is a sectional side view of the fastening assembly of FIG. 11 taken along lines 12—12.

DETAILED DESCRIPTION OF THE INVENTION

Figure 1:
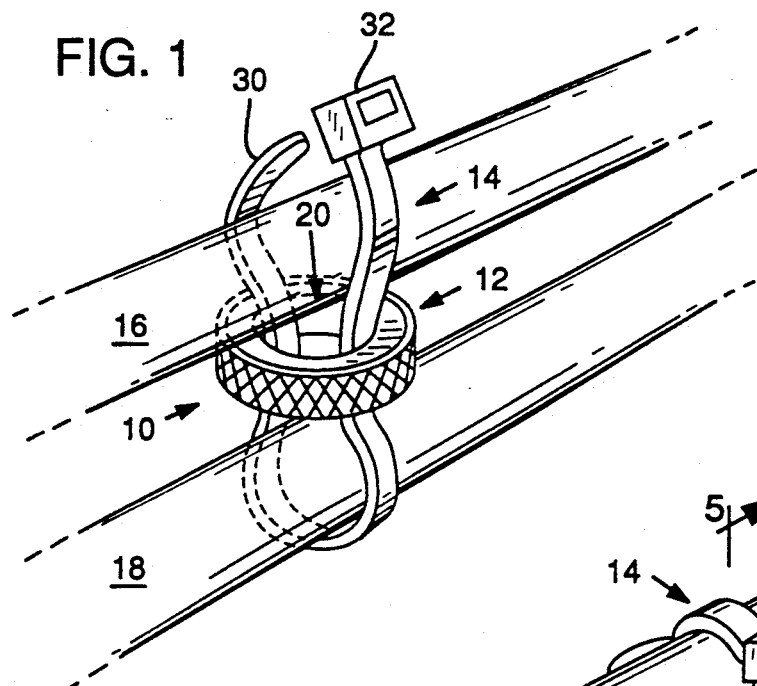
FIG. 1 is a perspective view of a preferred embodiment of the fastening assembly of the present invention, the assembly comprising an annular member and strap and depicted prior to closure of the strap around the cables to be held.
Figure 2:
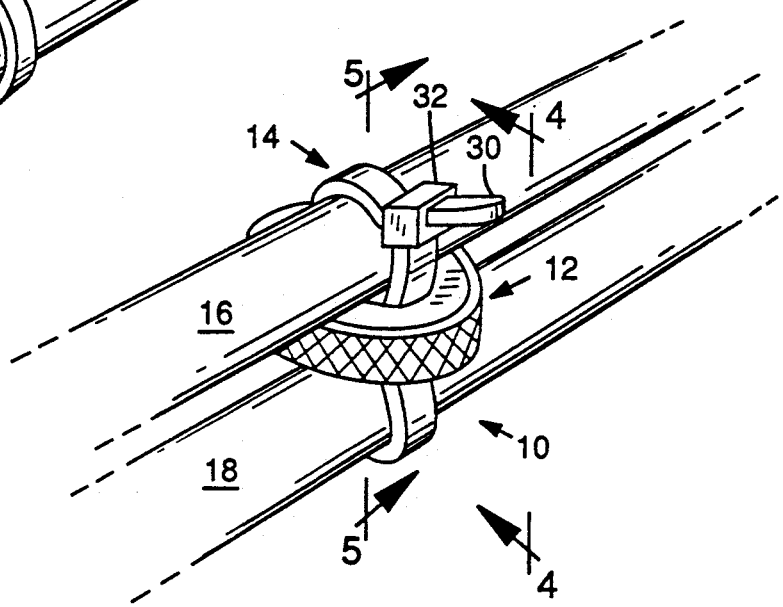
FIG. 2 is a perspective view of the fastening assembly of FIG. 1, but depicted after closure of the strap around the cables.

Referring to FIGS. 1 and 2, the preferred embodiment of the fastening assembly 10 comprises an annular member 12 and a flexible strap 14 of nondeformable material. As indicated, this fastening assembly can be used to fasten together one elongate articles, such as cable 16 to another elongate article, such as cable 18. Although fastening of cables will now be described, fastener assembly 10 is suitable for fastening of many other types of elongate articles, including, but not limited to, rigid metal tubing, flexible rubber and plastic hoses, electrical cabling and supporting beams. As will be made apparent, the preferred embodiment shown is particularly suited for use in an environment where sustained vibrational forces are experienced, such as on an aircraft.

Figure 3:
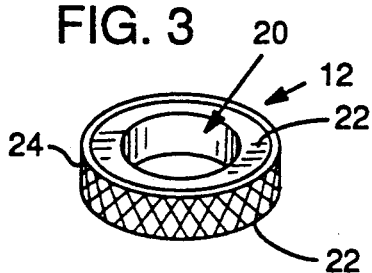
FIG. 3 is a perspective view, by itself, of the annular member depicted in FIGS. 1 and 2.

Referring to FIG. 3, an open-ended channel 20 is defined in the annular member 12 in communication with a respective upper and lower marginal edge 22 included thereon (only the upper marginal edge is visible in FIG. 3). Preferably, the annular member 12 is integrally formed of an elastomeric material. One preferred material for this purpose is SANTOPRENE TM manufactured by Monsanto of St. Louis, Mo. Other suitable materials include perfluoro elastomers such as KALREZ TM, made by E. I. DuPont deNemours of Wilmington, Del.; silicon rubber products such as made by CHR Industries, Inc. of New Haven, Conn.; and various industry thermoset rubber and rubber compounds. Such materials have been found to maintain their elastomeric properties despite repeated stressing, extremes in temperature and exposure to corrosive fluids.

Figure 4:
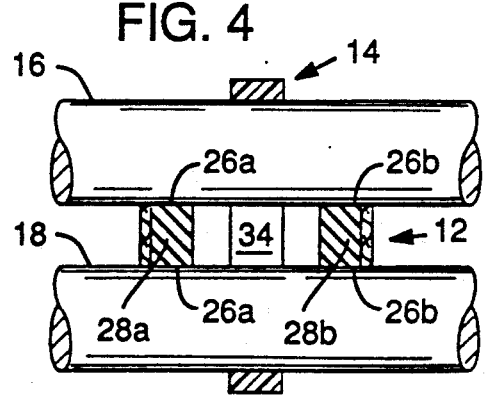
FIG. 4 is a sectional side view of the fastening assembly of FIG. 2, taken along lines 4—4.

During use of the cable fastener, each cable 16 and 18 is disposed in lengthwise relation against a respective marginal edge 22 of the annular member, as shown in sectional view by FIG. 4. In this position, each cable includes forward and rearward outer portions 26a and 26b, that are received upon, and resiliently opposed by, forward and rearward seating members 28a and 28b, respectively, formed in the annular member 12. These seating members, as will be described, enable the cable fastening assembly to tolerate sustained vibrational stress.

To hold each cable against the respective seating members 28a and 28b, the flexible strap 14 of nondeformable material is utilized. As shown in FIG. 1, this strap is of suitable flexibility and dimension to be passed around a respective one of the cables 16, through the channel 20, around a respective other of the cables 18 and back through the channel so as to encircle the cables. The free end 30 of the strap is drawn through the locking head 32 provided at the other end of the strap so as to achieve a closed-loop configuration as shown in FIG. 2. Straps, of the type depicted and described, often made of nylon polypropylene or stainless steel, are commercially available under the trade names of "CABLE-TIES" and "PUSH MOUNT TIES" and are made by manufacturers such as Panduit Corp. of Tinley Park, Ill. Other preferred strap materials include HALAR TM made by Allied Fiber and distributed through Panduit Corp. and TEFZEL TM, made by E. I. DuPont deNemours of Parkersburg, W. Va. The general description "nondeformable material" will be understood to encompass these and related groups of strap materials that, relative to elastomeric materials, have a relatively high resistance, through their bulk, to being stretched or compressed. This characteristic, in turn, accounts for their greater propensity to pinch into or chafe the articles which they bind.

Referring to FIG. 5, drawing in the free end 30 of the strap through the locking head 32 brings respective portions 34 of the strap, which pass through the channel 20, into resilient opposition with a pair of movable sidewall members 36 that adjoin the channel and that are integrally formed by the annular member 12. For cables of the size shown, the sidewall members cooperate to maintain respective other portions 38 of the strap in adjoinment against the respective cables 16 and 18 and ensure that each respective other portion 38 extends over a distance which is greater than one-half of the circumference of the cable being adjoined thereby. In this manner, a greater surface area of the strap 14 is held against each cable than would be held if the sidewall members 36 were absent, thereby providing better frictional engagement between the strap and cables for resisting cable slippage.

If the free end of the strap is drawn further through the locking head 32, past that point shown in FIG. 5 wherein the respective portions 34 of the strap have just been brought into adjoinment against the sidewall members 36, the situation depicted in FIG. 6 results. Compression of the resilient seating members 28a and 28b, and concomitant expansion of the resilient sidewall members 36, serve to absorb a portion of the work exerted in shortening the closed-loop length of tee strap by increment 40. If, as shown in FIG. 7, the strap is then shortened again, by an equal additional increment 42 of substantially equal size to increment 40, a further portion of work is absorbed, this further portion being greater than the original portion because the resilient seating members and sidewall members start, in FIG. 6, from a condition where they are already under resilient compression or expansion. In other words, the user who applies the work required to shorten the strap will feel the strap gradually tighten upon pulling and therefore is less likely to overtighten the strap to the point where the strap will crimp and deform the cables. Of course, breakage of the annular member 12, during tightening, is not a concern because of the resiliency of the integrally formed seating members and sidewall members.

Referring to FIG. 6, the seating members 28a (not visible) and 28b include outer surface areas 44 along each marginal edge 22. Viewing FIGS. 5 and 6 together, these outer surfaces can be seen to remain entirely adjoined against the respective outer portions 26 of the cables, without the presence of intervening gaps, irrespective of how tightly the cables are held by the strap against each marginal edge. A different result would be obtained, for example, if each seating member comprised a rigid channel or a pair of flexible arms, for then, depending on how tightly the cables were urged into the channel or arms, only the outer surface areas that were arranged along opposed sides of the channel or arms would adjoin the cable and intervening gaps would then exist. By elimination of these gaps, better frictional engagement is established between the annular member 12 and the cables since there is a greater area of engagement and fewer spaces available to trap solvents that could promote slippage. Additionally, referring to FIGS. 6 and 7, as the closed-loop length of the strap is decreased by the increment 42, the outer surface areas 44 increase in size due to the deformability of the seating members 28a (not visible) and 28b, thereby providing even more secure frictional engagement without causing deformation and damage to the cables.

Viewing FIGS. 6 and 8 together (and assuming the cables 16 and 18 are of a rigid type), if, after tightening, external forces are introduced to cause movement of the cables laterally toward each other in the direction indicated by arrows 46, the seating members 28a (not visible) and 28b will serve to resiliently oppose and dampen this movement. In this manner, the fastening assembly acts to restrain severe vibrational movement of the cables and, in particular, several fastening assemblies may each be secured at a different lengthwise position along the cables to provide a cumulative damping effect. It will be recognized that, during this inwardly directed movement of the cables, the tendency of the strap 14 to slacken and to lose its grip on the cables is counteracted by the action of sidewall members 36 which cooperatively urge respective portions 34 of the strap together, thereby removing the slack so that other respective portions 38 of the strap are maintained against the cables.

Viewing FIGS. 6 and 9 together, if external forces are present to cause movement of the cables laterally away from each other, in the direction indicated by arrows 48, the sidewall members 36 then act to resiliently oppose and dampen this movement as they movably expand against the outward movement of respective portions 34 of the strap. From the preceding description, then, it will be recognized that the cable fastening assembly dampens lateral vibrations along either direction of movement. By permitting dampened outward movement of the respective portions 34, the likelihood that the cables will become chafed is greatly reduced.

As indicated in FIG. 10, a cable 18' of smaller radius may be substituted for the larger radius cable 18 originally depicted. In large part, the aforementioned advantages of the invention do not require that the cables be of a particular dimension or that the dimensions of the cables be equivalent to each other. As indicated in FIG. 10, each outer surface area 44 of a respective seating means 28a or 28b responsively acquires a curvature complementary to the particular curvature of the cable being received thereupon. The deformability of the seating members 28a and 28b enable this responsiveness.

As depicted in FIGS. 11 and 12, a plurality of cables 16A, 16B and 16C of varying size can be fastened together with a suitable number of annular members 12 and a single strap 14.

Although a preferred embodiment of the cable fastening assembly 10 has been shown, as in FIGS. 1 and 2, and described, it will be recognized that other embodiments are possible within the broader teachings of the present invention. For example, the resilient seating members, 28a or 28b, may not be integrally formed by the annular member but rather may comprise separate elements each in communication with only one marginal edge. Furthermore, these seating members may provide resilient opposition without being deformable and resilient sidewall members may not be present.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An improved fastening assembly for lashing elongate articles, each having a forward and rearward outer portion, such as pipes, cables, rods, tubing, wiring or hoses, comprising:

(a) an annular member having an open-ended channel defined therein, said annular member including an upper and lower marginal edge, each marginal edge being in communication with said channel;

(b) flexible strap means of nondeformable material for holding lengthwise against each respective marginal edge of said annular member a corresponding one of said articles, said strap means being adapted for passage around a first of said corresponding one of said articles, through said channel, around a second of said corresponding one of said articles and back through said channel so as to establish a closed-loop configuration, said strap means including means independent of said channel for shortening the length of said closed-loop configuration; and (c) said annular member including forward and rearward seating means for receiving and resiliently opposing, along each marginal edge, the forward and rearward outer portion, respectively, of said corresponding one of said articles whereby said annular member cushionably yields to each of said corresponding one of said articles when these same articles are forcibly moved laterally together.

2. The fastening assembly of claim 1 wherein each of said seating means includes an outer surface area, said outer surface area being substantially entirely adjoined against the corresponding outer portion of said corresponding one of said articles.

3. The fastening assembly of claim 2 wherein each of said seating means includes means for increasing, by deformation, said outer surface area as said length of said closed-loop configuration is shortened.

4. The fastening assembly of claim 1 wherein said forward seating means and said rearward seating means includes means for permitting resiliently damped lateral movement of said first and second of said corresponding one of said articles toward each other despite said closed-loop configuration having a constant length.

5. The fastening assembly of claim 1 wherein said annular member includes a pair of movable sidewall means, adjoining said channel, for resiliently opposing the respective portions of said strap means passing through said channel.

6. The fastening assembly of claim 5 wherein said sidewall means cooperate to permit resiliently damped lateral movement of said first and second of said corresponding one of said articles away from each other despite said closed-loop configuration having a constant length.

7. The fastening assembly of claim 5 wherein said sidewall means cooperate to maintain said strap means against said articles as said articles are moved toward each other despite said closed-loop configuration having a constant length.

8. The fastening assembly of claim 5 adapted for lashing said articles when each of said corresponding one of said articles is rounded, wherein said sidewall means cooperate to maintain respective other portions of said strap means adjoined against said first and second, respectively, of said corresponding one of said articles and to ensure that each respective other portion extends over a distance greater than one-half the circumference of said corresponding one of said articles adjoined thereby.

9. The fastening assembly of claim 5 wherein said annular member is composed of an elastomeric material, said seating means and said sidewall means being formed integrally in said annular member.

10. The fastening assembly of claim 1 adapted for lashing said articles when each of said corresponding one of said articles is provided with a rounded outer portion of a predetermined curvature, wherein each respective seating means includes means for acquiring a curvature complementary to said predetermined curvature of said corresponding one of said articles received thereupon.

11. The fastening assembly of claim 1 wherein said forward seating means and said rearward seating means include means for absorbing a portion of the work required to shorten said length by a predetermined increment.

12. The fastening assembly of claim 11 wherein said forward and rearward seating means include means for gradually increasing the amount of work required to shorten said length by each additional said predetermined increment.

13. The improved fastening assembly of claim 1 wherein said nondeformable material is selected from the group consisting of nylon polypropylene and stainless steel.

14. An improved fastening assembly for lashing elongate articles, each having a forward and rearward outer portion, such as pipes, cables, rods, tubing, wiring or hoses, comprising:

(a) an annular member having an open-ended channel defined therein, said annular member including an upper and lower marginal edge, each marginal edge being in communication with said channel;

(b) said annular member including forward and rearward seating means for receiving and resiliently opposing along each marginal edge the forward and rearward outer portion of a corresponding one of said articles disposed in lengthwise relation thereacross;

(c) flexible strap means of nondeformable material for holding against the respective seating means along each marginal edge said corresponding one of said articles by passage of respective portions of said strap means through said channel so as to encircle each of said corresponding one of said articles within a closed loop configuration that remains open through said channel; and (d) said annular member including a pair of movable sidewall means for resiliently opposing said respective portions of said strap means passing through said channel whereby said strap means alternately either yields to each of said corresponding one of articles when these same articles are forcibly moved laterally apart or grippingly bears against each of said corresponding one of said articles when these same articles are forcibly moved laterally together.

* * * * *

UNITED STATES PATENT AND TRADEMARK OFFICE
CERTIFICATE OF CORRECTION

PATENT NO. : 5,083,346

DATED : January 28, 1992

INVENTOR(S) : Douglas O. Orton

It is certified that error appears in the above-identified patent and that said Letters Patent is hereby corrected as shown below:

Column 4, Line 53, delete "description" and substitute --designation--;

Column 5, line 18, delete "tee" and substitute --the--;

Column 7
Claim 4, line 30, delete "includes" and substitute --include--.

Signed and Sealed this

Tenth Day of August, 1993

Attest:

MICHAEL K. KIRK

Attesting Officer

Acting Commissioner of Patents and Trademarks